United States Patent
Burckart et al.

(10) Patent No.: US 8,640,094 B2
(45) Date of Patent: Jan. 28, 2014

(54) BUILDING OPTIMIZED DOWNLOAD MODULES LEVERAGING MODULARIZED DEPENDENCIES

(75) Inventors: Erik J. Burckart, Raleigh, NC (US); Andrew J. Ivory, Wake Forest, NC (US); Todd E. Kaplinger, Raleigh, NC (US); Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 13/175,228

(22) Filed: Jul. 1, 2011

(65) Prior Publication Data

US 2013/0007706 A1 Jan. 3, 2013

(51) Int. Cl.
*G06F 9/44* (2006.01)

(52) U.S. Cl.
USPC .......................................................... 717/120

(58) Field of Classification Search
USPC .......................................................... 717/120
See application file for complete search history.

(56) References Cited

U.S. PATENT DOCUMENTS

| | | | |
|---|---|---|---|
| 6,481,008 B1 * | 11/2002 | Chaiken et al. | 717/158 |
| 6,868,539 B1 * | 3/2005 | Travison et al. | 717/100 |
| 7,243,346 B1 | 7/2007 | Seth et al. | |
| 7,590,748 B2 * | 9/2009 | MacKay et al. | 709/230 |
| 8,005,929 B1 * | 8/2011 | Okhotski | 709/220 |
| 8,302,078 B2 * | 10/2012 | Thunemann et al. | 717/125 |
| 8,381,176 B1 * | 2/2013 | Bentley et al. | 717/107 |
| 2006/0174195 A1 * | 8/2006 | White | 715/522 |
| 2009/0013336 A1 | 1/2009 | Backhouse et al. | |
| 2009/0031210 A1 | 1/2009 | Backhouse | |
| 2010/0169863 A1 | 7/2010 | Adams | |

OTHER PUBLICATIONS

"Ivy—The Agile Dependency Manager", http://ant.apache.org/ivy/ (Obtained from the Internet on Jun. 17, 2011) Sep. 30, 2010, 2 pages.

"Web Resource Optimizer for Java (wro4j)", http://code.google.com/p/wro4j/ (Obtained from the Internet on Jun. 17, 2011) May 31, 2011, 2 pages.

Higgins, Bill, "Ajax Code Loading Optimization Techniques", http://billhiggins.us/blog/2010/10/26/ajax-code-loading-optimization-techniques/ (Obtained from the Internet on Jun. 17, 2011) Oct. 26, 2010, 15 pages.

Jenkins, Scott, "Build Profiles", http://www.dojotoolkit.org/reference-guide/build/profiles.html (Obtained from the Internet on Jun. 17, 2011) 2005-2011, 3 pages.

* cited by examiner

*Primary Examiner* — Wei Zhen
*Assistant Examiner* — Lanny Ung
(74) *Attorney, Agent, or Firm* — DeLizio Gilliam, PLLC

(57) ABSTRACT

Embodiments relate to building a downloadable application. In response to a request to build a downloadable application, a build system determines a set of resources used by the downloadable application. The build system reads this initial set of resources to discover other resources used by the downloadable application. The build system determines resource dependencies for the set of resources and the discovered set of resources, and creates a dependency data structure according to the resource dependencies. Using the dependency data structure, the build system determines a subset of the set of resources and the discovered set of resources to include in a module associated with the downloadable application.

21 Claims, 4 Drawing Sheets

BUILDING OPTIMIZED DOWNLOAD MODULES LEVERAGING MODULARIZED DEPENDENCIES

BACKGROUND

Embodiments of the inventive subject matter generally relate to the field of networked computer system, and, more particularly, building downloadable applications using modularized dependencies to determine modules to include in the downloadable application.

Over time, web pages have grown increasingly sophisticated. For example, in the past, the content of a particular web page was fairly static. The content of the page did not change from one request to another. Today, web pages are dynamic, and the content of a particular page can be tailored to a particular user. Further, the content has become more sophisticated. For example, a web page can be designed to run application software downloaded from a web server.

Additionally, the types of devices that are capable of requesting and using web pages have grown. Now, in addition to traditional desktop computers, phones, tablet computers, music players etc. are now able to request and use web pages. Such devices may be connected to networks having differing capabilities (high bandwidth, low bandwidth etc.).

As the content for web pages has grown more sophisticated, so has the size of the content. A downloadable application for a web page can include hundreds if not thousands of modules. Past applications have tended to download modules as they are requested by a downloadable application. This can lead to a noticeable (and potentially irritating) pause in the execution of a downloadable application while the application waits for a module to be loaded.

SUMMARY

Embodiments include a computer program product and an apparatus for building a downloadable application. In response to a request to build the downloadable application, a build system determines a set of resources used by the downloadable application. The build system reads this initial set of resources to discover other resources used by the downloadable application. The build system determines resource dependencies for the set of resources and the discovered set of resources, and creates a dependency data structure according to the resource dependencies. Using the dependency data structure, the build system determines a subset of the set of resources and the discovered set of resources to include in a module associated with the downloadable application.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

The embodiments of the invention automatically determine resources that are to be included in one or more modules for a downloadable application such that the modules are optimized to include only those resources that satisfy resource dependencies of the downloadable application. In previous systems, software developers have manually determined the modules and resources to build into an application. Such a manual process is difficult to manage given the number of resources a typical application requires. Further, errors in determining which resources to provide for an application build can lead to frustration by end users. If the developer is over-inclusive, the application can take longer to download to a client device. If the developer is under-inclusive, the client device must obtain the necessary resources at run-time, which can lead to irritating pauses while running the application.

The novel application build system described below determines, at application build time, modules that are optimized to include resources that satisfy resource dependencies of an application without including modules and resources that are not required by the application.

Figure 1:
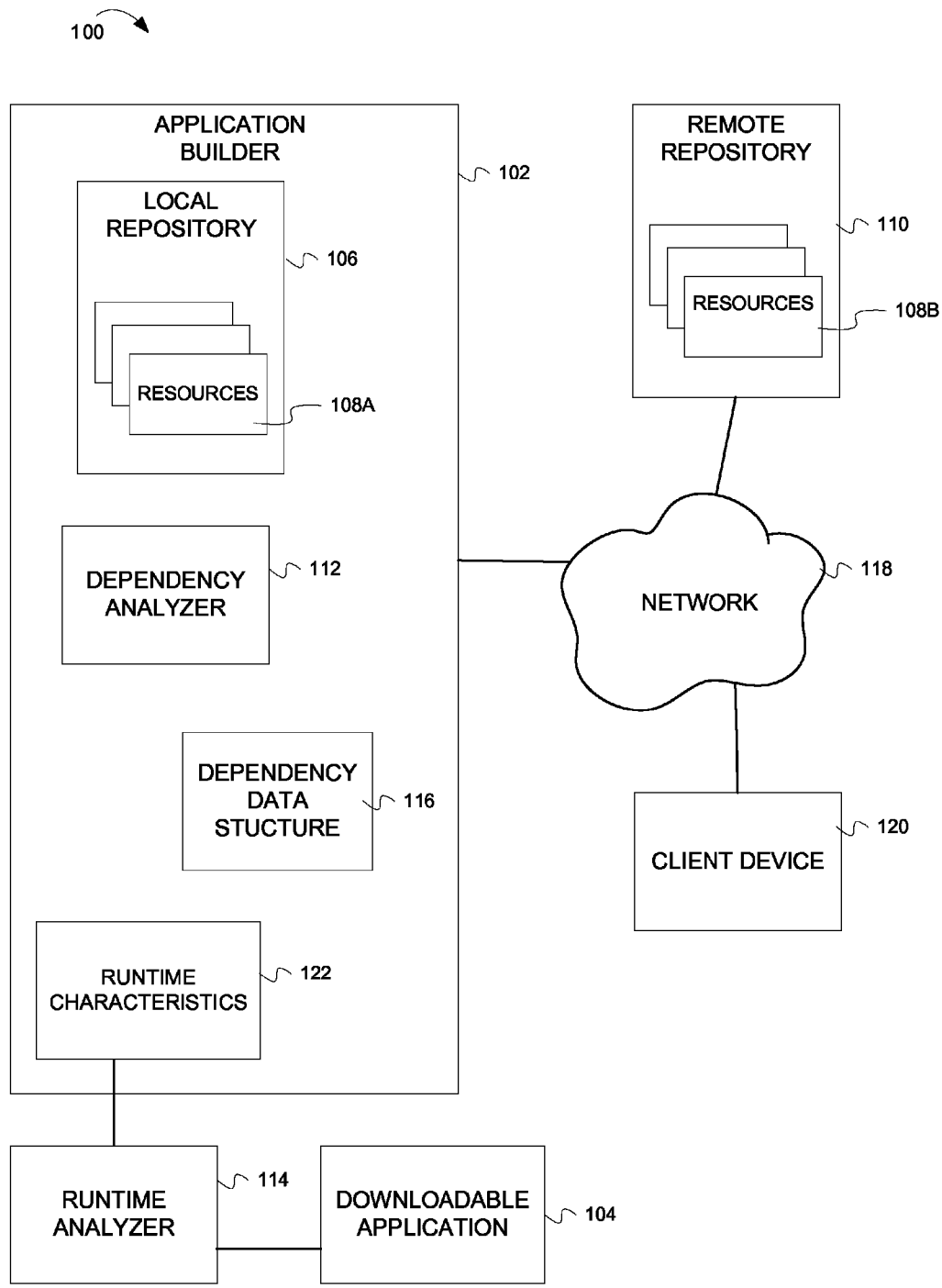
FIG. 1 depicts logical components of an application builder for building a downloadable application.

FIG. 1 depicts a system 100 for building a downloadable application. System 100 includes an application builder 102 for building applications such as downloadable application 104. Downloadable application 104 is typically comprised of multiple resources 108 that are used (or potentially used) by downloadable application 104 during the runtime of the application. Hundreds or even thousands of resources may be used during the runtime of a downloadable application. One or more resources may be provided as part of a module. In general, application builder 102 determines which resources may be used during the runtime of a downloadable application, and using techniques described below, assembles the resources into one or more modules that can be downloaded and run on a client device 120.

The resources 108 can be of various types. Examples of resources include, but are not limited to, JavaScript resources, CSS (Cascading Style Sheet) resources, or HTML (HyperText Markup Language) resources. Additionally, resources can comprise audio and video data files that are used by a downloadable application. Other types of resources are possible and within the scope of the inventive subject matter. Resources may also be referred to as web-facing resources.

Resources 108 may be stored in a repository. In some embodiments, a Maven repository system may be used. A repository may be a local repository 106 or a remote repository 110. Local repository 106 is resident on the system that application builder 102 executes on. In other words, local repository 106 is available to application builder 102 without requiring network access. Remote repository 110 is on a different system than application builder 102. Application builder 102 uses network 118 to access the remote repository 110. In some embodiments, network 118 is the Internet. In alternative embodiments, network 118 may be a LAN, WAN or corporate intranet.

In response to a request to build a downloadable application 104, dependency analyzer 112 reads a set of resources that have been identified as being included in the downloadable application 104 and determines dependencies within the identified resources on other resources that have were not necessarily identified as being included in the downloadable application 104 (referred to as "discovered resources"). The dependency analyzer 112 then analyzes the discovered resources for any dependencies on other resources. The process continues recursively until no new resources are discovered as a dependency of another resource.

As resources are identified or discovered, identifiers for the resources are added to a dependency data structure 116. In some embodiments, dependency data structure 116 comprises a dependency graph. The dependency data structure 116 may be used to identify a name of a resource, the location of the resource, the number of references to the resource, and resources that depend on the resource. The dependency data structure 116 is then used to determine a subset of resources 108 that will potentially be used by downloadable application 104. A module containing the subset of resources is then created. The module may be downloaded by a client device 120 that is to execute the downloadable application 104.

The module that is created as described above may be referred to as an "optimized module." The module is optimized in the sense that it contains the resources that downloadable application 104 may need during its runtime, but does not include substantially more than what may be required.

Client device 120 may be any type of device configured to execute a downloadable application 104. Examples of such devices include personal computers, laptop computers, tablet computers, personal digital assistants, mobile telephones, and set-top boxes. The embodiments of the invention are not limited to any particular type of client device 120.

The above-described dependency analysis may be referred to as a static analysis. That is, the information used to determine dependencies is obtained from the resources themselves. In some embodiments, the system includes runtime analysis to determine dependencies and resources to include in one or more modules of downloadable application 104. Runtime analyzer 114 monitors the execution of downloadable application 104. The analysis may be performed on test systems prior to deployment of the application or the analysis may be performed as users download and run downloadable application 104 onto their client devices 120.

The runtime analysis may produce runtime characteristics 122. The runtime characteristics may include resource dependencies that were not discovered during the static analysis. Additionally, the runtime characteristics 122 may include statistics such as the number of times a resource was used by various instances of downloadable application 104. The runtime characteristics 122 may be used by dependency analyzer 112 to modify dependency data structure 116, for example, by adding resources that were discovered during the runtime analysis and by including usage statistics for the resources in the dependency data structure 116.

Further details on the operation of the system are provided below.

Figure 2:
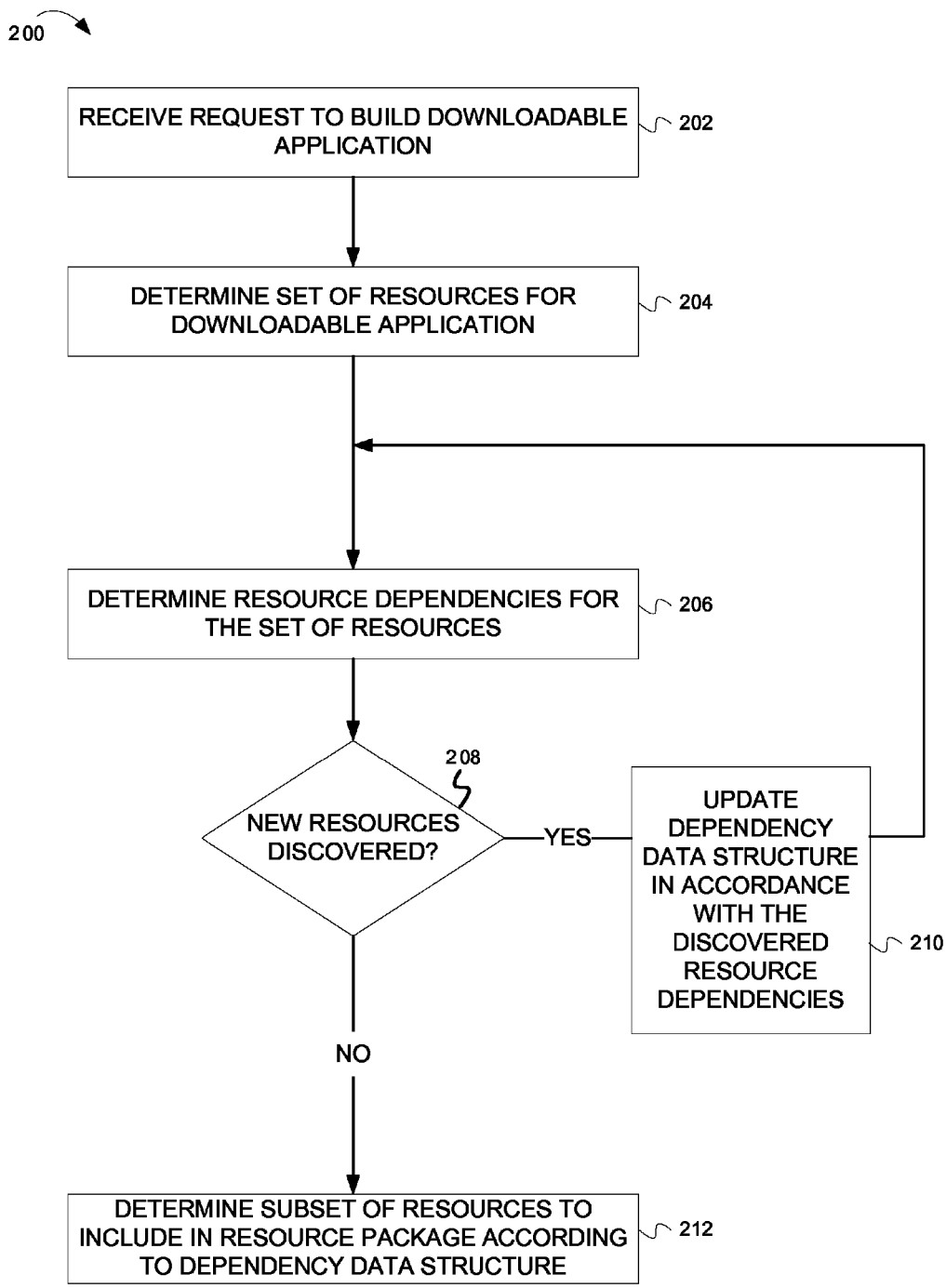
FIG. 2 depicts a flowchart illustrating example operations for building a downloadable application.

FIG. 2 depicts a flowchart 200 illustrating example operations for building a downloadable application. For example purposes, operations associated with the blocks in FIG. 2 will be described as being performed by an application build system ("system"), which may, for example, include any or all of the elements described in FIG. 1 or 4. FIG. 2 illustrates a flow 200 that the system can perform.

At block 202, the system receives a request to build a downloadable application. The request may be issued from within an application development environment or as a command line to a command interpreter.

At block 204, the system determines an initial set of resources associated with the application. The system discovers URIs (Uniform Resource Identifiers) that may include or refer to valid resources for an application. For example, the system determines file types, file locations and repositories (both local and remote) that may contain valid resources for a downloadable application. The system may use development toolkits, development frameworks, development environments or other application development tools to determine where valid resources may be located.

As noted above, the system also uses dynamic analysis of previous executions of an application to provide data to the system. Such dynamic analysis may identify browser plug-ins, include libraries, or other resources that are used by an application.

At block 206, the system determines a set of resources that have dependencies based on the currently identified resources or modules. In some embodiments, the system reads the definitions of the resource (for example, from a file containing the definition of the resource) to determine dependencies in the resource. The system may identify dependencies in various ways. In examples where a resource is a JavaScript resource, a dependency may be identified using an "import" statement. In examples where a Dojo toolkit is used, a "require" statement may identify a dependency. HTML resource files may be scanned to determine dependencies on CSS files, rules or other resources. CSS rules and inheritance may be used to identify dependencies. For example, a CSS class may depend from its parent. In addition, a CSS rule may be overridden by a later encountered rule. Thus in some embodiments, the ordering of rules is analyzed to determine the true dependencies associated with the CSS rules used by an HTML resource.

At block 208, the system checks to determine if any new resource dependencies were discovered. If the system discovers new resource dependencies, then at block 210 the system updates the dependency data structure with the newly discovered dependencies and returns to block 206 to determine if further dependencies exist in the newly discovered resources.

Otherwise, if no new dependencies are found, at block 212, the system uses the dependency data structure to determine the set of resources to include in a resource package for a downloadable application. The dependency data structure may be analyzed in various ways to determine which resources to include. For example, the system may analyze the dependency data structure to determine ordering issues that may affect whether a resource is actually needed to resolve a dependency. As in the example noted above, CSS resources may be overridden and thus not necessarily be required to resolve dependencies. The dependency data structure can be used to determine whether ordering of CSS resources affects the dependency on CSS resources. Such analysis can be effective in removing numerous unnecessary CSS rules and resources from an application.

Further, the system may analyze the dependency data structure to determine the modularization of the downloadable application. For example, the list may be used to determine a Dojo profile. In some embodiments, the system builds all of the resources identified in the dependency data structure into a single module for a downloadable application. In alternative embodiments, the system builds multiple modules using the dependency data structure. For example, data from runtime analysis of an application may also be used in conjunction with the dependency data to determine how many different resource modules to build for a downloadable application. Statistical analysis obtained from the run-time analysis may be used to determine that resources that are frequently used are placed in a module that is downloaded when the application is instantiated on a client device, while resources that are seldom actually used by the application may be placed in a module that is downloaded only if a resource in the module is actually needed by the downloadable application.

Additionally, other processes executed during the build of a downloadable application may use the dependency data structure build the downloadable application. For example, an application minimizer process may use the dependency data structure to determine a set of resources that are to be minimized before being included in modules for the downloadable application. The list may be used to supply resources to other optimizing tools for further optimization of a downloadable application.

The depicted flowchart is provided as an example to aid in understanding embodiments, and should not be used to limit embodiments. Embodiments can perform additional operations, fewer operations, operations in parallel, operation in a different order, etc.

Figure 3:
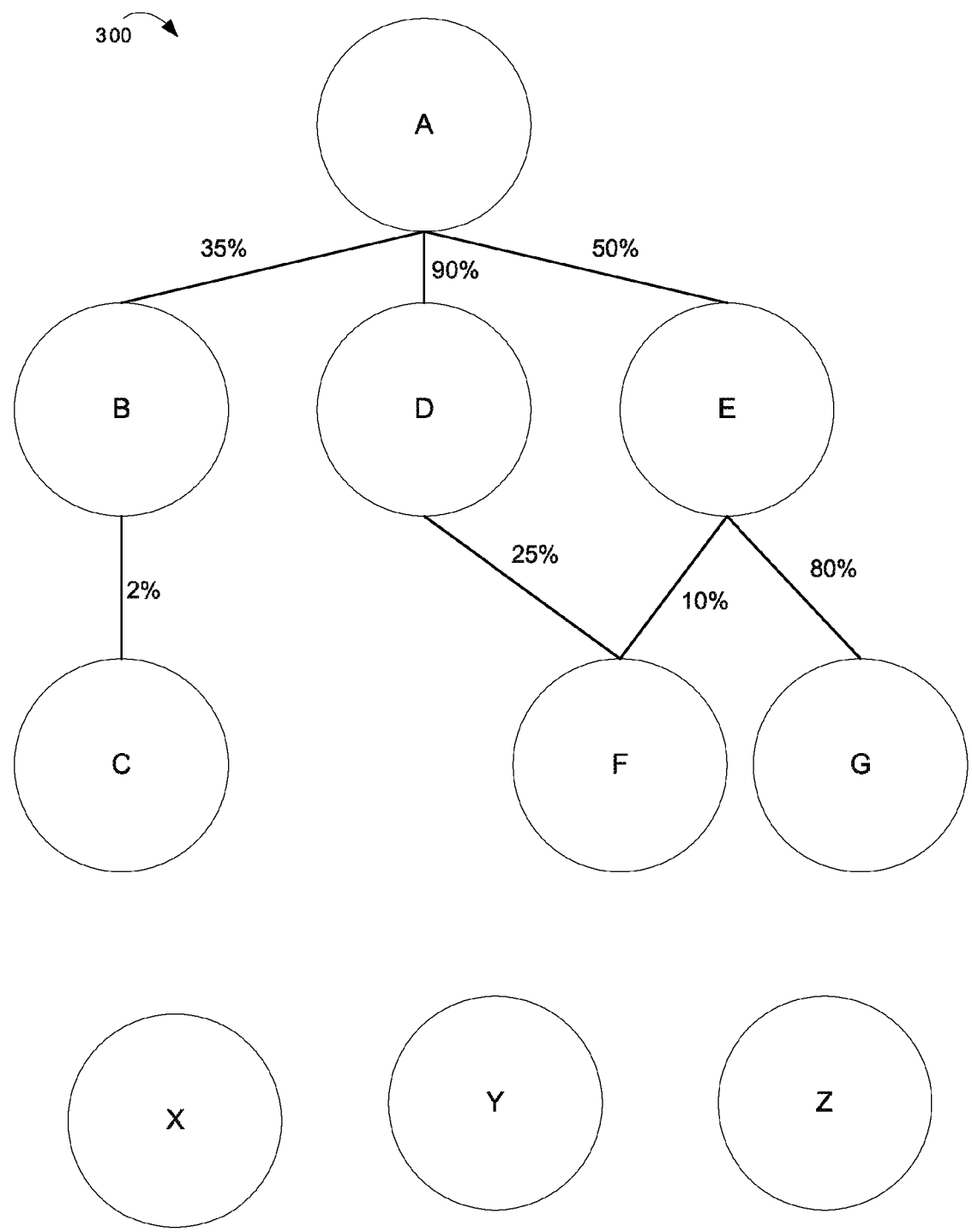
FIG. 3 depicts an example dependency graph.

FIG. 3 depicts an example dependency graph 300. In the example shown, resources A-G are identified as potentially being used by a downloadable application. Those of skill in the art will appreciate that a typical downloadable application will use many more resources than those illustrated in FIG. 3. In the example illustrated, resource A depends on resources B-E. Resource B in turn depends on resource C. Resource D depends on resource F and resource E depends on both resource F and G. Resources X, Y and Z were identified as potential resources for the application, but during the process described above, eliminated as not being required (for example, the resource was in a toolkit referenced by the application but not actually used, or the resource was overridden by another resource). The links illustrating the dependencies in dependency graph 300 indicate the results of statistical analysis of previous instances of the application, that provide the percentage of times the resource is actually used in previous instances of the application.

Applying the above-described method to the example dependency graph, some embodiments build a resource library for the downloadable application that includes all of the modules A-G while excluding X-Z. Alternative embodiments may determine that because resource C is seldom used (2%), that modules A-B and D-G may be built in a library that is downloaded upon application instantiation on a client device, while resource C is built in a library that is only downloaded when needed by a running application.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
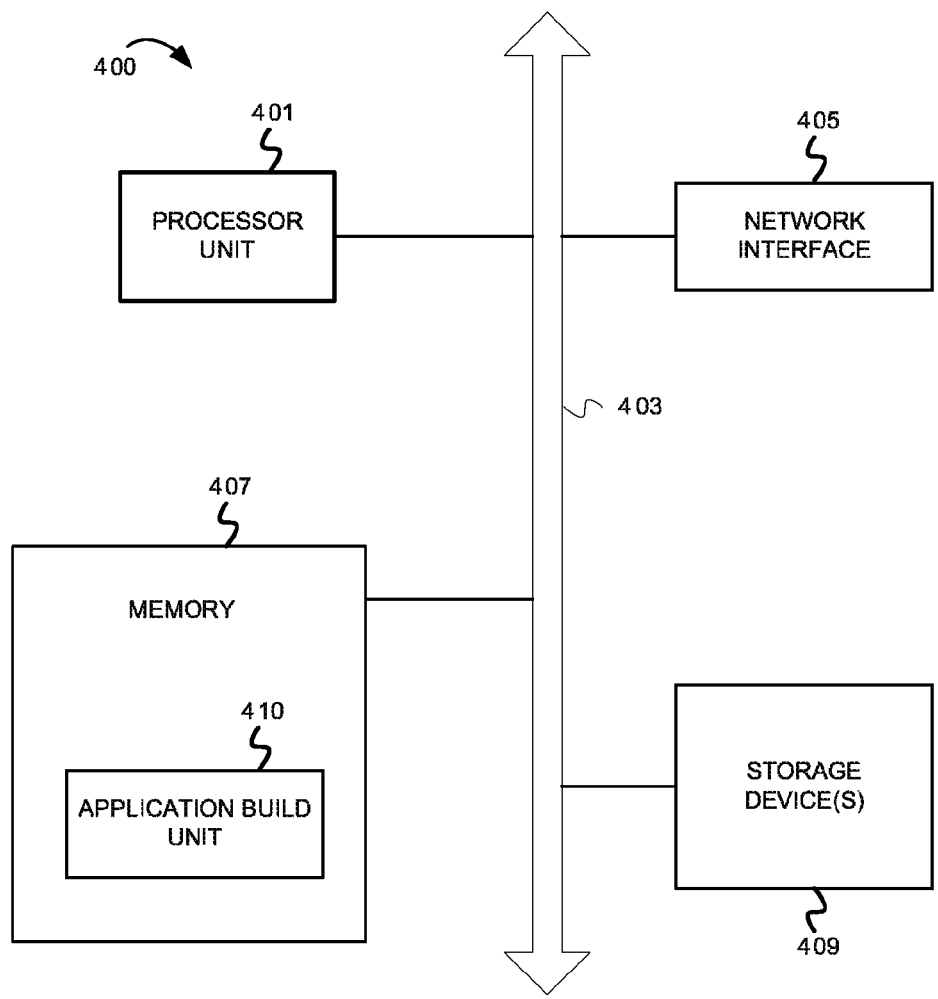
FIG. 4 depicts an example computer system including an application builder unit.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The memory 407 embodies functionality to implement embodiments described above. The memory 407 may include one or more functionalities that facilitate the method of building a downloadable application as described above. Any one of these functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for building a downloadable application leveraging modular dependencies as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for building a downloadable application, the computer program product comprising:
a computer readable storage medium having computer usable program code embodied therewith, the computer usable program code comprising a computer usable program code configured to:
determine, in response to a request to build a downloadable application, a set of resources used by the downloadable application;
read the set of resources while building the application to determine a discovered set of resources used by the downloadable application;
determine resource dependencies for the set of resources and the discovered set of resources;
create a dependency data structure according to the resource dependencies; and
determine, in accordance with the dependency data structure, a subset of the set of resources and the discovered set of resources to include in a module associated with the downloadable application, wherein the computer usable program code is configured to determine inclusion of a resource in the module from the subset of the set of resources and the discovered set of resources based at least in part on a frequency of use of the resource.

2. The computer program product of claim 1, wherein the dependency data structure includes a dependency graph.

3. The computer program product of claim 1, wherein the computer usable program code is configured to determine exclusion from the module of a first resource that has been overridden by a second resource.

4. The computer program product of claim 1, wherein the computer usable program code is further configured to minimize the subset of the set of resources and the discovered set of resources.

5. The computer program product of claim 1, wherein the set of resources includes one or more style sheets having style sheet resources, and wherein the computer usable program code is further configured to analyze the set of resources includes computer usable program code configured to determine a subset of style sheet resources used by an HTML file.

6. The computer program product of claim 1, wherein the computer usable program code is configured to create the module having the subset of the set of resources and the discovered set of resources, wherein as part of downloading of the downloadable application, the module is downloaded.

7. The computer program product of claim 6, wherein the computer usable program code is configured to:
determine a percentage of usage by the downloadable application of resources in the subset;
in response to the percentage of usage of a first at least one resource of the resources being greater than a usage threshold, maintaining the first at least one resource in the module for downloading with the downloadable application; and
in response to the percentage of usage of a second at least one resource of the resources being less than the usage threshold, excluding the second at least one resource from the module for downloading with the downloadable application.

8. A computer program product for building a downloadable application, the computer program product comprising:
a computer readable storage medium having computer usable program code embodied therewith, the computer usable program code comprising a computer usable program code configured to:
determine, in response to a request to build a downloadable application, a set of resources used by the downloadable application;

read the set of resources while building the application to determine a discovered set of resources used by the downloadable application;

determine resource dependencies for the set of resources and the discovered set of resources;

create a dependency data structure according to the resource dependencies;

analyze runtime characteristics of the downloadable application;

determine, in accordance with the dependency data structure and the runtime characteristics, a subset of the set of resources and the discovered set of resources to include in a module associated with the downloadable application, wherein the computer usable program code is configured to determine inclusion of a resource in the module from the subset of the set of resources and the discovered set of resources based at least in part on a frequency of use of the resource.

9. The computer program product of claim 8, wherein the computer usable program configured to analyze runtime characteristics of the downloadable application includes computer usable program code configured to determine resource usage of the downloadable application.

10. The computer program product of claim 9, wherein the resource usage of the downloadable application includes a frequency of use of the resource across multiple runs of the downloadable application.

11. The computer program product of claim 8, wherein the computer usable program code is configured to create the module having the subset of the set of resources and the discovered set of resources, wherein as part of downloading of the downloadable application, the module is downloaded.

12. The computer program product of claim 11, wherein the computer usable program code is configured to:

determine a percentage of usage by the downloadable application of resources in the subset;

in response to the percentage of usage of a first at least one resource of the resources being greater than a usage threshold, maintaining the first at least one resource in the module for downloading with the downloadable application; and in response to the percentage of usage of a second at least one resource of the resources being less than the usage threshold, excluding the second at least one resource from the module for downloading with the downloadable application.

13. An apparatus comprising:

one or more processors;

a computer readable storage medium having computer usable program code for the one or more processors embodied therewith, the computer usable program code comprising a computer usable program code configured to:

determine, in response to a request to build a downloadable application, a set of resources used by the downloadable application;

read the set of resources while building the application to determine a discovered set of resources used by the downloadable application;

determine resource dependencies for the set of resources and the discovered set of resources;

create a dependency data structure according to the resource dependencies; and determine, in accordance with the dependency data structure, a subset of the set of resources and the discovered set of resources to include in a module associated with the downloadable application, wherein the computer usable program code is configured to determine inclusion of a resource in the module from the subset of the set of resources and the discovered set of resources based at least in part on a frequency of use of the resource.

14. The apparatus of claim 13, wherein the dependency data structure includes a dependency graph.

15. The apparatus of claim 13, wherein the computer usable program code is configured to determine exclusion from the module of a first resource that has been overridden by a second resource.

16. The apparatus of claim 13, wherein the computer usable program code is further configured to:

analyze runtime characteristics of the downloadable application; and modify the dependency data structure based on the runtime characteristics.

17. The apparatus of claim 13, wherein the computer usable program configured to analyze runtime characteristics of the downloadable application includes computer usable program code configured to determine resource usage of the downloadable application.

18. The apparatus of claim 13, wherein the computer usable program code is further configured to minimize the subset of the set of resources and the discovered set of resources.

19. The apparatus of claim 13, wherein the set of resources includes one or more style sheets having style sheet resources, and wherein the computer usable program code is further configured to analyze the set of resources includes computer usable program code configured to determine a subset of style sheet resources used by an HTML file.

20. The apparatus of claim 13, wherein the computer usable program code is configured to create the module having the subset of the set of resources and the discovered set of resources, wherein as part of downloading of the downloadable application, the module is downloaded.

21. The apparatus of claim 20, wherein the computer usable program code is configured to:

determine a percentage of usage by the downloadable application of resources in the subset;

in response to the percentage of usage of a first at least one resource of the resources being greater than a usage threshold, maintaining the first at least one resource in the module for downloading with the downloadable application; and in response to the percentage of usage of a second at least one resource of the resources being less than the usage threshold, excluding the second at least one resource from the module for downloading with the downloadable application.

* * * * *